2,714,247

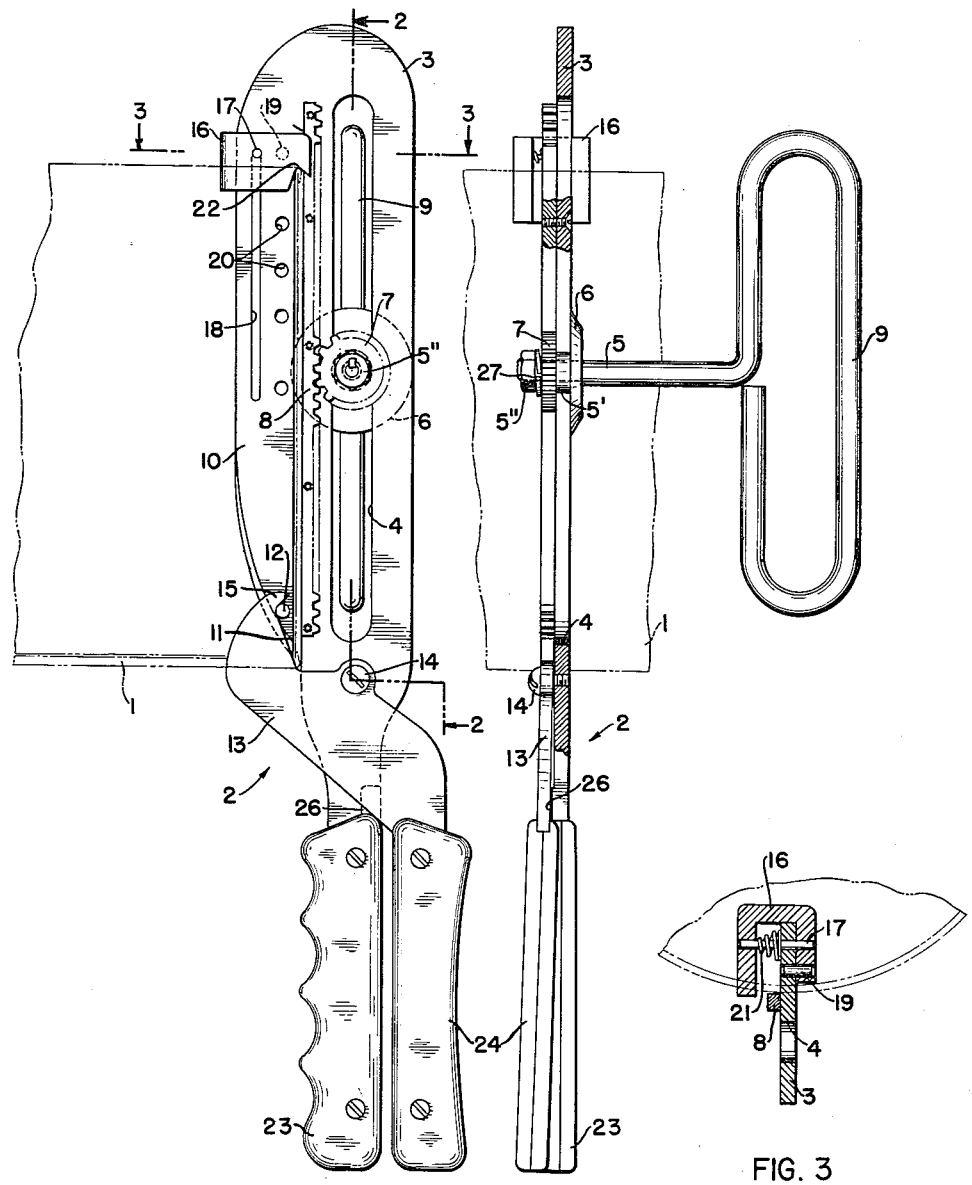

OPENER FOR METAL CONTAINERS

Louis B. Whatley, Asheboro, N. C.

Application December 1, 1954, Serial No. 472,385

9 Claims. (Cl. 30—3)

This invention relates generally to an opener for metal containers and more particularly to an opener for slitting the straight sides of containers of the tin can variety.

It has been found desirable in the field of horticulture to grow from seedlings various plants in small containers and to later transplant them when they grow larger. Metal containers of the common tin can variety have long been used as such containers in which to grow plants from seedlings and have been preferable to earthen vessels because they will retain moisture and thus require considerably less attention. Also, they are usually readily available at no cost. However, when the seedlings grow to such an extent that it becomes necessary to remove the plant and its attendant roots from the can, much soil is removed from the roots as it tends to stick to the sides of the can. This results in damage to the roots of the plant and very often in loss of the complete plant. It is therefore, an object of this invention to provide for a means of slitting the sides of tin cans without damage to the plant roots so that the plant roots and surrounding soil may be removed from the can with a minimum of damage.

I propose to provide a can opener which may be inserted through one end of a metal container or can so that its cutting means may be operated to cut or slit the straight sided portion of the can and thus allow the can to be unwrapped from around the plant and soil inside of it. Broadly, my new opener comprises a plate having a gripping means on one end and a longitudinally extending slot on the other end. Extending through the slot is an axle on which is mounted a cutting wheel or disc and a pinion which is adapted to engage with a rack mounted on the plate adjacent to the slot. A tongue or support member is mounted with one end connected to the plate and the other end lying free. This tongue or supporting member runs parallel to the slot and rack and is adapted to be inserted in the can so that it fits over one of the can's straight sides which thus lies between the tongue and plate. I also provide the opener with a handle which is pivotally mounted for rotation on the plate and has a locking means for piercing the bottom of the can and engaging the free end of the tongue in order to lock the opener on the can. Stop means can be slidably mounted on the tongue so that the opener can readily be adapted for use with different size cans.

For a more detailed description of my invention reference may be made to the accompanying drawings in which Fig. 1 is a side view of a preferred form of my new opener shown mounted on the side of a tin can;

Fig. 2 is a sectional view of the opener taken along lines 2—2 of Fig. 1; and

Fig. 3 is a sectional view taken along lines 3—3 of Fig. 1 showing the construction of the adjustable stop means.

Referring to Fig. 1, 1 is a tin can on which is mounted my new type opener denoted generally by 2. It comprises a plate 3 having a longitudinally extending slot 4 and an axle 5 which, as best seen in Fig. 2, extends through slot 4 and has mounted on it a rotatable cutting wheel or disc 6. Also mounted on axle 5 is a pinion 7 which engages with a rack 8 which is mounted on the plate 3 and extends parallel with slot 4. The end of the axle 5 is turned or bent in order to form a handle 9 so that the axle may be readily turned. A freely rotatable bushing 5' may be mounted on the axle to ride on the sides of slot 4 and thus decrease the force necessary to turn axle 5. A nut 5" secures the assembly to the plate 3. A lock washer 27 in addition to aiding in maintaining nut 5" on axle 5 also serves to provide for limited resilient axial movement of axle 5 and cutter 6 to prevent any binding of the latter.

A tongue or support piece 10 is mounted at one end of or made integral with plate 3 and has a free end 11. The tongue is so positioned that a side of the can 1 may be fitted between it and the main portion of plate 3 when it is inserted in the can. The free end of the tongue may be sharpened to a knife-like edge so that it may easily glide through the soil and roots.

Mounted on the end of tongue 10 is a pin 12 which is engageable with an end 15 of a handle 13 which is rotatably mounted on plate 3 to rotate about a pivot point 14. The end of handle 13 is sharpened so that when the opener is placed over the can with the tongue extended as far into the can as it will go and the handle 13 is rotated about its pivot 14, end 15 will pierce or cut through the bottom of the can and lock with pin 12. To assure proper cooperation between the end 15 of handle 13 and the end of tongue 10 in piercing the bottom of the can I provide a cam portion 26 on the handle end of plate 3 to raise the handle 13 slightly during the latter portion of its pivotal movement during which its end 15 is passing over the end of tongue 10. The cam 26, by reason of its urging the end 15 of handle 13 against the free end of tongue 10 also thereby serves to maintain tongue 10 in good cutting relationship with cutting wheel 6 during a cutting operation. Besides serving as a lock to hold the opener on the can, handle 13 also provides support for tongue 10 to make it act as an effective backing member against which the cutting wheel may press the side of the can in cutting it.

The construction of the adjustable stop means is best seen in Fig. 3. It consists of a U-shaped member 16 that is adapted to embrace and slide along the outer edge of tongue 10. A guide pin 17 traveling in a slot 18 in the tongue guides the stop means in its travel along the tongue edge. The stop means is adjustably positioned along the tongue by a pin 19 which is adapted to fit in holes or apertures 20 placed at different positions along the tongue. A spring 21 continually forces the stop means in a direction so that the pin 19 will always tend to be forced into one of the holes or apertures 20. The holes 20 are located at such positions along the tongue that hook 22 of the stop means will fit over the edge of different size cans while the free end of tongue 11 will be closely adjacent the bottom of the can. Thus, in order to use my new opener on different size cans, that is cans having varying lengths, one merely has to move the adjustable stop against its spring, slide it along the tongue to the desired aperture and then let the spring push the pin 19 into the aperture.

Mounted on the adjacent lower ends of plate 3 and handle 13, respectively, are grips 23 and 24 which provide means by which the opener may be firmly grasped. Grip 23 may be so positioned with respect to handle 13 that it serves as a stop to limit rotation of handle 13 in a locking direction and so prevent undue bending of tongue 10.

An advantage of an opener constructed as exemplified above, is that the cutting wheel engages the outside of the can before contacting the dirt on the inside, thus protecting the wheel from grit which tends to dull the cutting surfaces.

The operation of my new opener is as follows: The adjustable stop 16 is adjusted to the desired aperture for the length of the can to be cut. Handle 13 is left in an open position and the cutting wheel 6 is run to the upper end of the rack 8 while at the same time the tongue 10 is inserted inside of the can so that the can will come between the tongue and the plate. The tongue is pushed into the can until the top of the can engages hook 22 of the stop means. Handle 13 is then closed causing the pointed end 15 to cut through the bottom of the can and to hook on the pin 12. Holding the opener securely by the grips 23 and 24, handle 9 is then turned causing the cutting wheel 6 to ride down the length of the can and so slit it. When the operation is finished, handle 13 is opened thus releasing the opener from the can. The side walls of the can may then be manually bent back and a plant contained therein and substantially all of the soil about and among its roots removed for replanting.

It is apparent that the example shown above has been given solely by way of illustration and not by way of limitation and that it is subject to many variations and modifications within the scope of the present invention, as defined in the appended claims.

I claim:

1. An opener for cutting straight sides of metal containers comprising a plate having a longitudinally extending slot therein, a rack mounted on said plate adjacent said slot, a rotatable cutting wheel mounted on an axle extending through said slot, a pinion mounted on said axle and adapted to mesh with said rack, and a tongue having a free end and a closed end integral with said plate running substantially parallel to said slot and said rack, said tongue being adapted, when said opener is in cutting position on a container, to be on one side of a straight side of said container, the plate, rack, axle, pinion and cutting wheel lying on the other side thereof.

2. An opener according to claim 1 wherein a handle is rotatably mounted on said plate and is adapted to engage said free end of said tongue to operatively lock said opener on said container.

3. An opener according to claim 1 wherein said free end of said tongue has a knife-like cutting edge.

4. An opener according to claim 1 wherein said tongue has mounted thereon adjustable stop means for limiting the length of container side wall that can be positioned between said tongue and said plate.

5. An opener according to claim 4 in which said tongue is provided with a plurality of holes therethrough which are spaced longitudinally thereof and in which said stop means is provided with a positioning pin adapted to be removably received in any of said holes to position the stop means.

6. An opener for cutting straight sides of metal containers comprising back-up means engageable with the inner face of a straight side to be cut substantially throughout its length, cutter carrying means adapted to lie without the container substantially opposite said back-up means and in close proximity to the outer face of said straight side, cutting means movably mounted on said cutter carrying means, manually engageable means for moving said cutting means along said straight side to cut said straight side in cooperation with said back-up means, said back-up means and said cutter-carrying means being permanently secured together at one pair of adjacent ends, and means movably mounted on said cutter-carrying means adjacent its opposite end for releasable engagement with the opposite end of said back-up means to fixedly secure the opener on said container side.

7. An opener according to claim 6 which includes stop means adjustably mounted on one of said back-up means and said cutter-carrying means to adapt the opener for use with containers of different length sides.

8. An opener for cutting straight sides of metal containers comprising a plate having a longitudinally extending slot therein, a rack mounted on said plate adjacent said slot, a rotatable cutting wheel mounted on an axle extending through said slot, a pinion mounted on said axle and adapted to mesh with said rack, a tongue having a free end and a closed end integral with said plate running substantially parallel to said slot and said rack, said tongue being adapted when said opener is in said cutting position on a container to be on one side of a straight side of said container, the plate, rack, axle, pinion and cutting wheel lying on the other side thereof, a handle rotatably mounted on said plate and adapted to engage said free end of said tongue to operatively lock said opener on said container, and cam means formed on one of said plate and said handle and adapted when said handle is rotated on said plate to urge said handle into engagement with said free end of said tongue in a direction normal to the plane of rotation of said handle.

9. An opener for cutting straight sides of metal containers comprising back-up means engageable with the inner face of a straight side to be cut substantially throughout its length, cutter-carrying means adapted to lie without the container substantially opposite said back-up means and in close proximity to the outer face of said straight side, cutting means movably mounted on said cutter-carrying means, manually engageable means for moving said cutting means along said straight side to cut said straight side in cooperation with said back-up means, and means on said cutter-carrying means for engaging a container when the opener is in operative position thereon to maintain the opener on the container during the cutting operation.

References Cited in the file of this patent

UNITED STATES PATENTS

| | | |
|---|---|---|
| 734,304 | Crecelius | July 21, 1903 |
| 785,225 | Manly | Mar. 21, 1905 |
| 1,047,175 | Cooper | Dec. 17, 1912 |

FOREIGN PATENTS

| | | |
|---|---|---|
| 335,413 | Germany | Mar. 31, 1921 |